United States Patent
Hafuka (10) Patent No.: US 7,860,154 B2
(45) Date of Patent: Dec. 28, 2010

(54) SPREAD SPECTRUM RECEIVER FOR RESTORING RECEIVED SYMBOLS WITH A SYMBOL DETECTION WINDOW ADJUSTED IN OPTIMAL AND A METHOD THEREFOR

(75) Inventor: Takamitsu Hafuka, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 818 days.

(21) Appl. No.: 11/806,718

(22) Filed: Jun. 4, 2007

(65) Prior Publication Data

US 2007/0291826 A1   Dec. 20, 2007

(30) Foreign Application Priority Data

Jun. 14, 2006   (JP) .............................. 2006-164557

(51) Int. Cl.
*H04B 1/00* (2006.01)

(52) U.S. Cl. ................................................. 375/150

(58) Field of Classification Search ................ 375/148, 375/149, 150, 152, 229, 343, 142, 317, 350, 375/354, 368; 370/208, 210, 292, 343, 515, 370/320, 335, 342, 347
See application file for complete search history.

(56) References Cited

U.S. PATENT DOCUMENTS 5,140,538 A * 8/1992 Bass et al. ....................... 708/3
5,629,639 A * 5/1997 Williams ....................... 327/60
6,385,232 B1 * 5/2002 Terashima ................... 375/149
2006/0018370 A1 * 1/2006 Mizuno ....................... 375/150

FOREIGN PATENT DOCUMENTS

JP   2002-057602   2/2002
JP   2004-153692   5/2004

* cited by examiner

*Primary Examiner*—David C Payne
*Assistant Examiner*—Syed Haider
(74) *Attorney, Agent, or Firm*—Studebaker & Brackett PC; Donald R. Studebaker

(57) ABSTRACT

A spread spectrum receiver has less symbol detection error due to noise. Correlation values between an input signal and spread code sequences are produced by correlators correspondingly provided for the spread code sequences. When an optimum window width symbol detection window is open, the correlation values are compared with a correlation threshold. When the correlation values exceed the correlation threshold, symbol data of the spread code sequence corresponding to the correlator outputting the correlation value indicating the maximum correlation peak is used to demodulate received symbol data. The optimum window width of the symbol detection window is generated from the correlation values and position information of the correlation peak values. The correlation threshold is updated to the produced correlation threshold. The position information of the correlation peak values is used to adjust the symbol detection window width, thus providing the least symbol detection error.

2 Claims, 8 Drawing Sheets

SPREAD SPECTRUM RECEIVER FOR RESTORING RECEIVED SYMBOLS WITH A SYMBOL DETECTION WINDOW ADJUSTED IN OPTIMAL AND A METHOD THEREFOR

BACKGROUND OF THE INVENTION

1. Field of the Invention

The present invention relates to a spread spectrum receiver, and more specifically, to a spread spectrum receiver having the function of controlling a symbol detection window, and a method thereof.

2. Description of the Background Art

Conventionally, one type of the spread spectrum communication receivers employs a digital matched filter as a measure of demodulating a received spread spectrum signal into symbol data. The digital matched filter functions as taking a correlation of an input signal with a sequence of transmission spread codes to output a correlation value. In order to restore symbol data from the correlation value, a correlation threshold is set, so that when the correlation value exceeds the correlation threshold it is estimated that a spread code sequence is transmitted which is associated with one of the correlators which outputs a correlation value indicating the maximum of the correlation peaks, that spread code sequence being used to demodulate the received symbol data. A variety of technologies have been disclosed concerning the detection window of the spread spectrum communication. Japanese patent laid-open publication No. 2002-57602, for example, discloses a method of detecting a slot timing from spread code sequences. Another Japanese patent laid-open publication No. 2004-153692 discloses a synchronous position detection method for detecting a synchronous position with the detection window made as small as possible for an accurate synchronous position determination.

The conventional methods have problems, however, that in a high noise environment, any input signal such as noise other than an intended input signal may cause a correlation value to exceed a threshold to provide the maximum correlation peak value, thus causing false data to be determined as appropriate received symbol data.

More particularly, the symbol detection window is open with a predetermined sectional width, such as a width corresponding to several chips of a spread code sequence. During a period when the symbol detection window is open, a poor communication status with a high noise level may allow correlation values corresponding to a plurality of spread code sequences to exceed the threshold and exhibit the correlation peak values. This case raises a problem where it is erroneously determined that the spread code sequence of an intended symbol correlation peak value is transmitted, thus providing a symbol detection error.

Under a poor communication condition with a high noise level, an intended signal input to a digital matched filter may not cause the correlation value to exceed the threshold, thus failing to determine a symbol. In that case, the threshold may be set lower so as to allow for the symbol detection at the expense of possible high detection error.

SUMMARY OF THE INVENTION

In view thereof, it is an object of the present invention to provide a spread spectrum receiver and a method therefor which are less in symbol detection error due to noise or the like.

In a spread spectrum receiver of the present invention, correlation values between an input signal and transmission spread code sequences are produced by correlators correspondingly provided for the transmission spread code sequences, and during a period when an optimum window width symbol detection window having an optimum window width is open, the correlation values are compared with a correlation threshold. When the correlation values exceed the correlation threshold, symbol data of the spread code sequence corresponding to the correlator that outputs the correlation value indicating the maximum of correlation peaks is used to demodulate the received symbol data.

More particularly, the present invention provides a spread spectrum receiver which comprises a plurality of correlators for obtaining correlations between a received spread spectrum signal input and all of spread code sequences for the received spread spectrum signal to produce resultant correlation values. In the receiver, the receiver compares the correlation values produced with a correlation threshold during a period in which a symbol detection window is open and which corresponds to a symbol detection period, and, when the correlation values exceed the correlation threshold, symbol data corresponding to the spread code sequence of one of the correlators which exceeds the correlation threshold is demodulated into received symbol data. The receiver further comprises: a correlation peak value detector for detecting a correlation peak value from the correlation values; a symbol detection window controller operative in response to the correlation values and position information of the correlation peak value optimum window width for producing information of the symbol detection window, and generating an optimum window width symbol detection window having an optimum window width from the optimum window width information; a comparator including a correlation threshold holding circuit for holding the correlation threshold, the comparator determining, during a predetermined period when the optimum window width symbol detection window is open, whether or not the correlation value exceeds the correlation threshold; and a symbol data selector for determining, when the correlation value exceeds the correlation threshold held in the correlation threshold holding circuit, symbol data corresponding to the spread code sequence of one of the correlators which produces the correlation value exceeding the correlation threshold as the received symbol data.

In accordance with one aspect of the present invention, the spread spectrum receiver may further comprise a correlation threshold generator for generating the correlation threshold from the information of the detection window width to provide the comparator with the threshold, the comparator updating the correlation threshold held in the correlation threshold holding circuit with the correlation threshold generated by the correlation threshold generator.

In accordance with another aspect of the invention, the correlation threshold generator may comprise: an average correlation threshold holding circuit for holding an average correlation threshold; a detection window width data storage for receiving from the comparator detection window width data included in the detection window width at a predetermined time interval to store the detection window width data therein; an average detection window width data calculator for calculating an average of the stored detection window width data, and holding the average as average detection window width data; and a correlation threshold calculator for receiving from the comparator the detection window width data included in the detection window width. The correlation threshold calculator compares the detection window width data with the average detection window width data, calculates a difference between the detection window width data and the average detection window width data, subtracts, when the detection window width data is larger than the average detection window width data, a value corresponding to the difference from the average correlation threshold held in the average correlation threshold holding circuit to obtain the correlation threshold to hold the obtained correlation threshold, and adds, when the detection window width data is smaller than or equal to the average detection window width data, a value corresponding to the difference to the average correlation threshold held in the average correlation threshold holding circuit to obtain the correlation threshold to hold the obtained correlation threshold. The receiver further comprises a transmitter for transmitting the obtained correlation threshold to the comparator.

The present invention also provides a method of receiving spread spectrum in which correlation values are obtained between an input signal and transmission spread code sequences by a plurality of correlators provided correspondingly to the transmission spread code sequences, the correlation values obtained during a period in which a symbol detection window is open are compared with a correlation threshold, the period corresponding to a symbol detection period, and, when the correlation values exceed the correlation threshold, symbol data corresponding to the spread code sequence associated with a correlation value indicating a maximum of correlation peak values is used to demodulate received symbol data. The method comprises: a first step of holding the correlation threshold; a second step of producing a correlation value between the input signal and the transmission spread code sequences; a third step of detecting the correlation peak value from the correlation values; a fourth step of producing from the correlation values and position information of the correlation peak values optimum window width information of the symbol detection window; a fifth step of generating from the optimum window width information an optimum window width symbol detection window having an optimum window width; a sixth step of determining, during a predetermined period when the optimum window width symbol detection window is open, whether or not the correlation values exceeds the correlation threshold; and a seventh step of determining, when the correlation values exceed the correlation threshold, the symbol data corresponding to the spread code sequence of one of the correlators which outputs the correlation value exceeding the correlation threshold as the received symbol data.

The present invention may control the symbol detection window width at the optimum and also control the correlation threshold at the optimum. The correlation values due to noise may thereby be excluded, thus preventing noise-induced symbol detection errors.

Particularly, the present invention may be advantageously applied to a spread spectrum receiver in the spread spectrum communication that uses a digital matched filter to demodulate or restore received data.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

With reference to the accompanying drawings, illustrative embodiments of the spread spectrum receiver of the present invention will be described below. The illustrative embodiments are directed to controlling a symbol detection window width to thereby solve the above-described problems in the prior art. It will first be described how the symbol detection window width is controlled.

Figure 1:
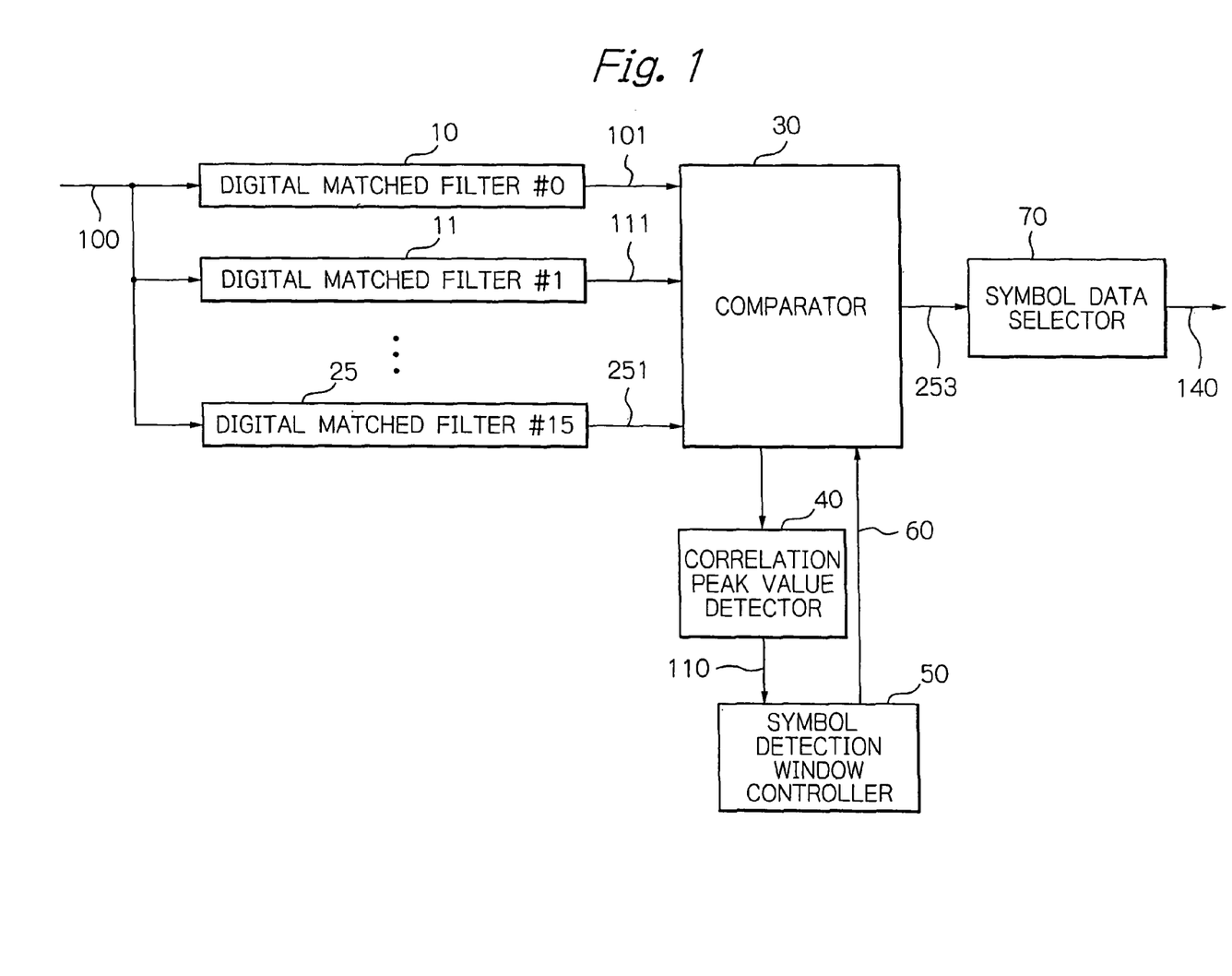
FIG. 1 is a schematic block diagram showing the configuration of a demodulator in a spread spectrum receiver in accordance with an illustrative embodiment of the present invention.

FIG. 1 schematically shows in a block diagram the configuration of a demodulator in a spread spectrum receiver in a preferred embodiment of the present invention. In the demodulator in the spread spectrum receiver in this illustrative embodiment, when a received spread spectrum signal 100 is input, a plurality (N) of correlators 10 to 25 respectively output correlation values 101, 111 to 251, from which a correlation peak value detector 40 detects peak values and outputs correlation peak value information 110, from which a symbol detection window controller 50 controls and sets the timing or window width of a symbol detection window, at which a comparator 30 monitors the correlation threshold and outputs determination information 253, from which a symbol data selector 70 determines the received symbol and outputs a symbol determined in the form of demodulated symbol data 140.

More particularly, the correlators 10, 11 to 25 are digital matched filters #0 to #(N−1), where N=16, for example, in this embodiment, which are adapted to receive the received spread spectrum signal 100, and output the correlation values 101, 111 to 251, respectively, which correspond to all of the plurality (N, in this example) of transmittable spread code sequences. Those$$ outputs 101, 111 to 251 are then input to a comparator 30. The incoming spectrum spread code 100 may have its code length corresponding to 32 chips and be of 16 types of code, for example. The incoming spectrum spread code 100 may have its sampling clock frequency eight times as high as the chip rate.

The correlation peak value detector 40 functions as detecting a peak value from the N correlation values, and outputs the peak value in the form of correlation peak value information 110 to the symbol detection window controller 50.

The symbol detection window controller 50 is adapted to use the correlation peak value information 110 to control the opening timing of the symbol detection window or the window width. The timing or window width is input as a control signal 60 to the comparator 30. The symbol detection window controller 50 may have a counter, not shown, for use in adjusting the window opening timing, and having eight bit positions, for example. The format of symbol data is of a packet structure including, for example, four bits of preamble followed by also four bits of information data field.

The comparator 30 is a monitoring circuit that determines, when the symbol detection window indicated by the control signal 60 is open, whether or not any of the N correlation values 101, 111 to 251 exceeds a correlation threshold. The comparator 30 feeds, when any of the correlation values exceeds the correlation threshold, the symbol data selector 70 with determination information 253 which indicates one of the digital matched filters 10, 11 to 15 which is associated with the correlation value exceeding the correlation threshold. The comparator 30 has a functional portion, not shown, which is adapted to hold the correlation threshold.

The symbol data selector 70 functions as using the determination information 253 to determine a received symbol.

Figure 2:
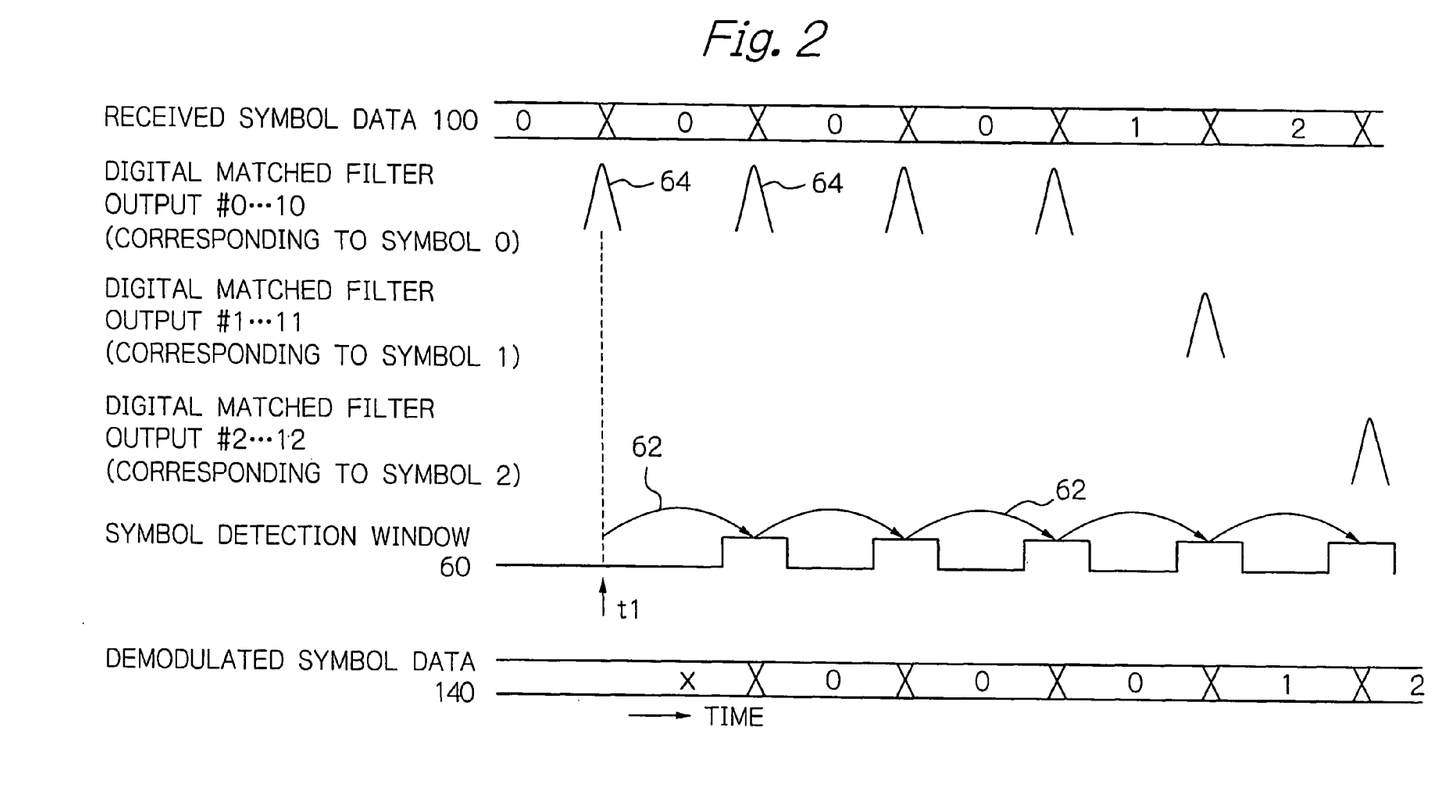
FIG. 2 illustrates how demodulated symbol data is produced in the embodiment shown in FIG. 1.

Referring additionally to FIG. 2, the operation of the demodulator in the instant embodiment will be described in detail. FIG. 2 is useful for understanding the operation from establishing initial synchronization through maintaining the synchronization to the output of demodulated data. Like elements are designated with the same reference numerals.

The received spread spectrum signal 100 sampled at the sampling clock described above is first input to each of the digital matched filters 10 to 25, which are correlators in the instant embodiment. In the following description, the signals are designated with the references of connections on which they are conveyed. The digital matched filters 10 to 25 calculate, for the input signal 100, 16 types, in the embodiment, of correlation values respectively corresponding to 16 types of spread code sequences.

The comparator 30 monitors, in order to establish initial synchronization by using the correlation values output from the 16 correlators 10, 11 to 25, only the correlation value of a symbol, e.g. "0", which corresponds to the preamble. When at time t1, for example, the correlation value exceeds the threshold, the comparator 30 determines that the initial synchronization is established, and moves to the operation of maintaining the synchronization. After having established the initial synchronization, the comparator 30 starts to monitor the correlation values of all of the 16 types of symbols.

The synchronization is maintained in the following fashion. The symbol detection window 60 is opened with the timing centered at which the duration of one symbol has elapsed since the establishment of the initial synchronization. In order to wait for a correlation value exceeding the correlation threshold, the symbol detection window controller 50 allows, after the establishment of the initial synchronization, a symbol timing counter 51, FIG. 5, to start to increment from a value "0" to "255" in the instant embodiment. In particular, when one symbol includes 32 chips and an oversampling is performed with eight times as high as the symbol interval, it leads to 256 samples. The counter 51 counts the symbol intervals, and the symbol detection window 60 is opened at predetermined intervals after having established the initial synchronization. The synchronization is thus held. The operation is denoted by an arrow 62 in FIG. 2.

The symbol data selector 70 then detects, while the symbol detection window 60 is open, a spread code sequence output 64 of the correlator outputs 101, 111 to 251 which provides a correlation value higher than the correlation threshold, FIG. 2. The symbol data selector 70 thus estimates a symbol whose spread code sequence is transmitted, and selects that received symbol to develop demodulated or restored symbol data 140.

Figure 3:
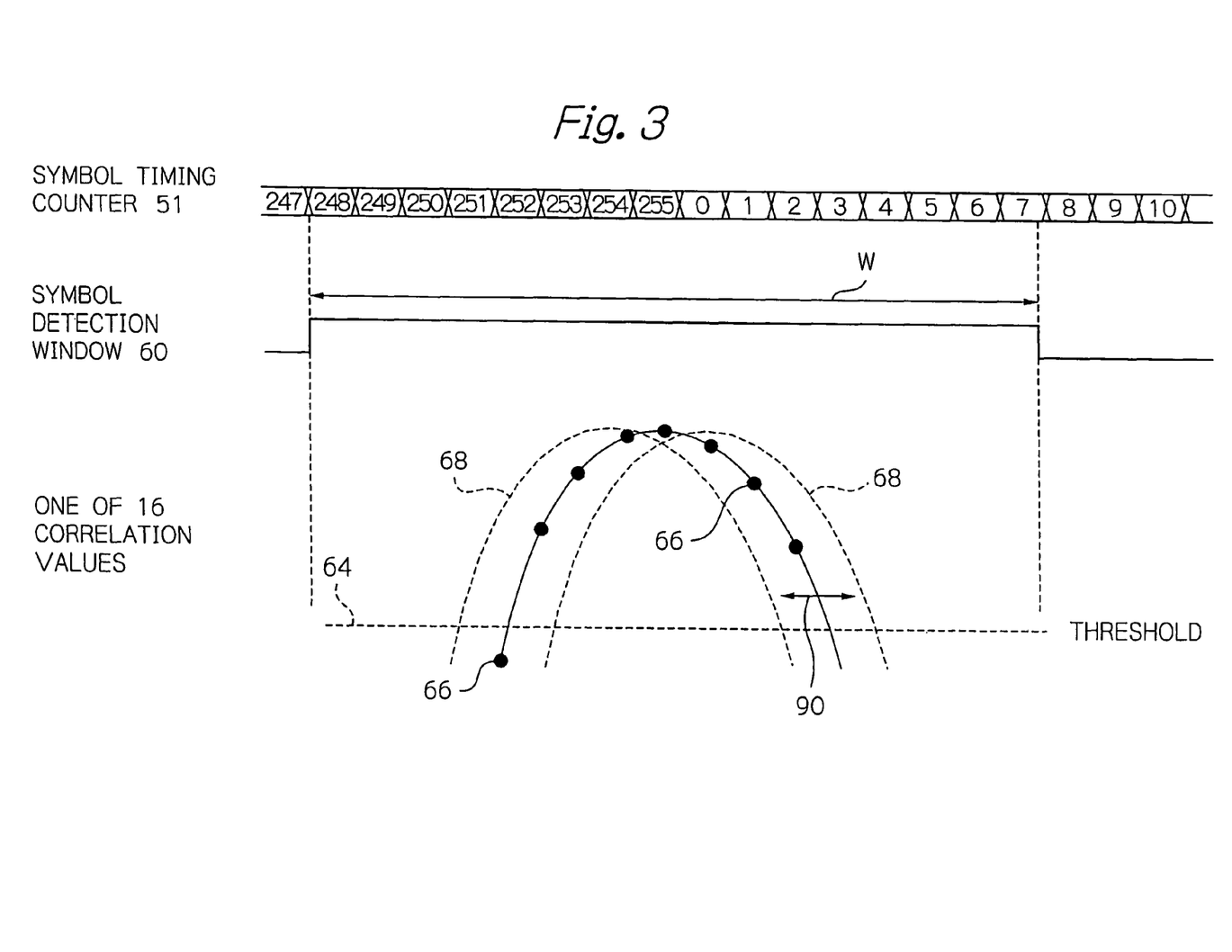
FIG. 3 illustrates in detail how the symbol detection window opens in the illustrative embodiment.

FIG. 3 shows in detail the symbol detection window opening 60 and its vicinity. In this example, the symbol detection window 60 has a preliminary width W that corresponds to the length of 16 sample clocks. The straight dotted line 64 denotes the threshold for one of the 16 types of correlation values in the instant embodiment. The dots 66 denote the sampling points. The dotted curves 68 show how the correlation value varies due to jitter 90.

Figure 4:
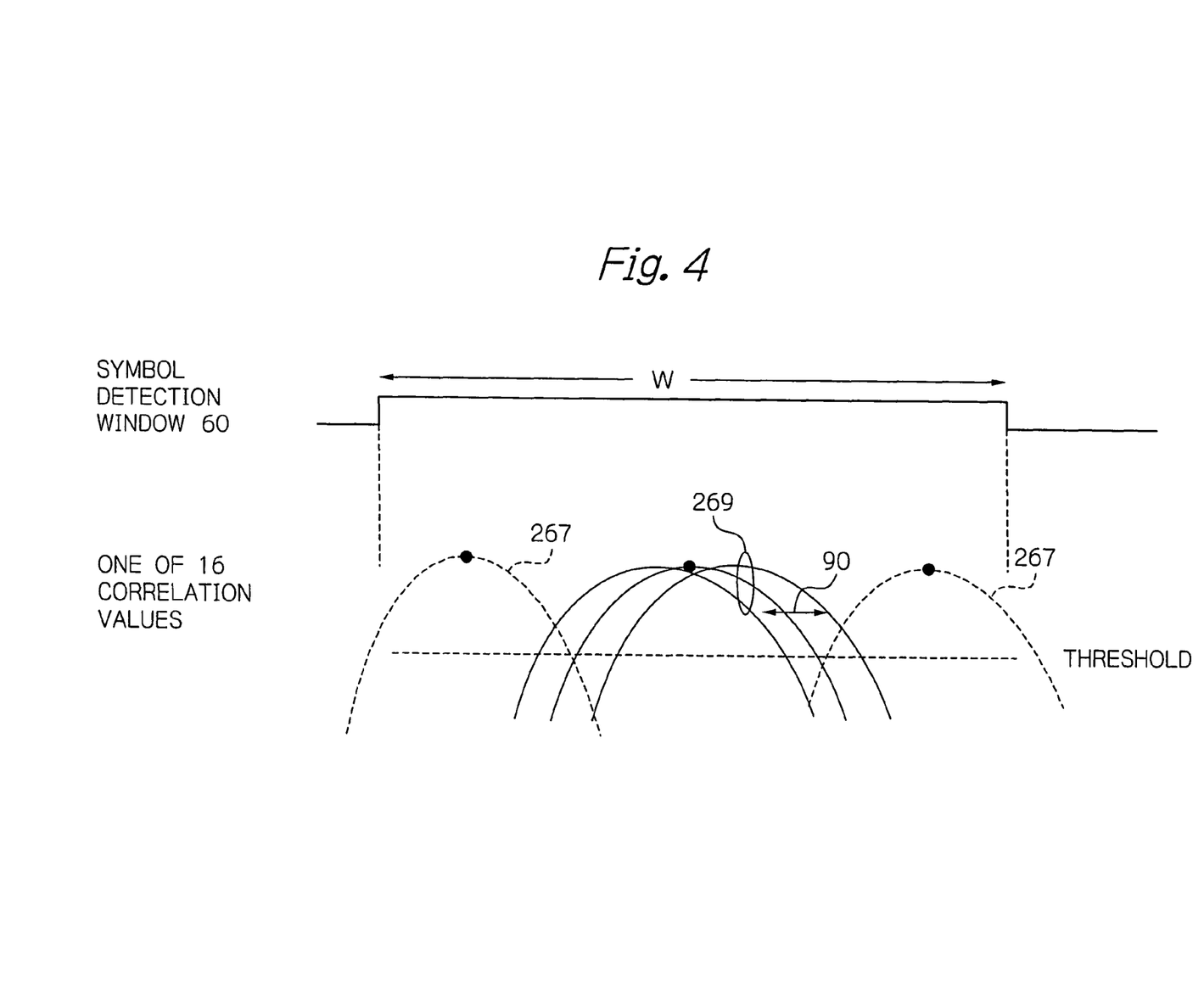
FIG. 4 illustrates how the symbol detection window is interfered with noise in the illustrative embodiment.

The symbol detection window 60 needs to have, considering that the correlation value may be jittered in a high noise environment, its width W wider than the duration corresponding to the samples of correlation value which exceed the threshold. As shown in FIG. 4, however, if the symbol detection window 60 were widely open considering the jitter 90, then a correlation value 267 exceeding the correlation threshold due to noise would have been output during the opening period W, thus causing a symbol error.

Figure 5:
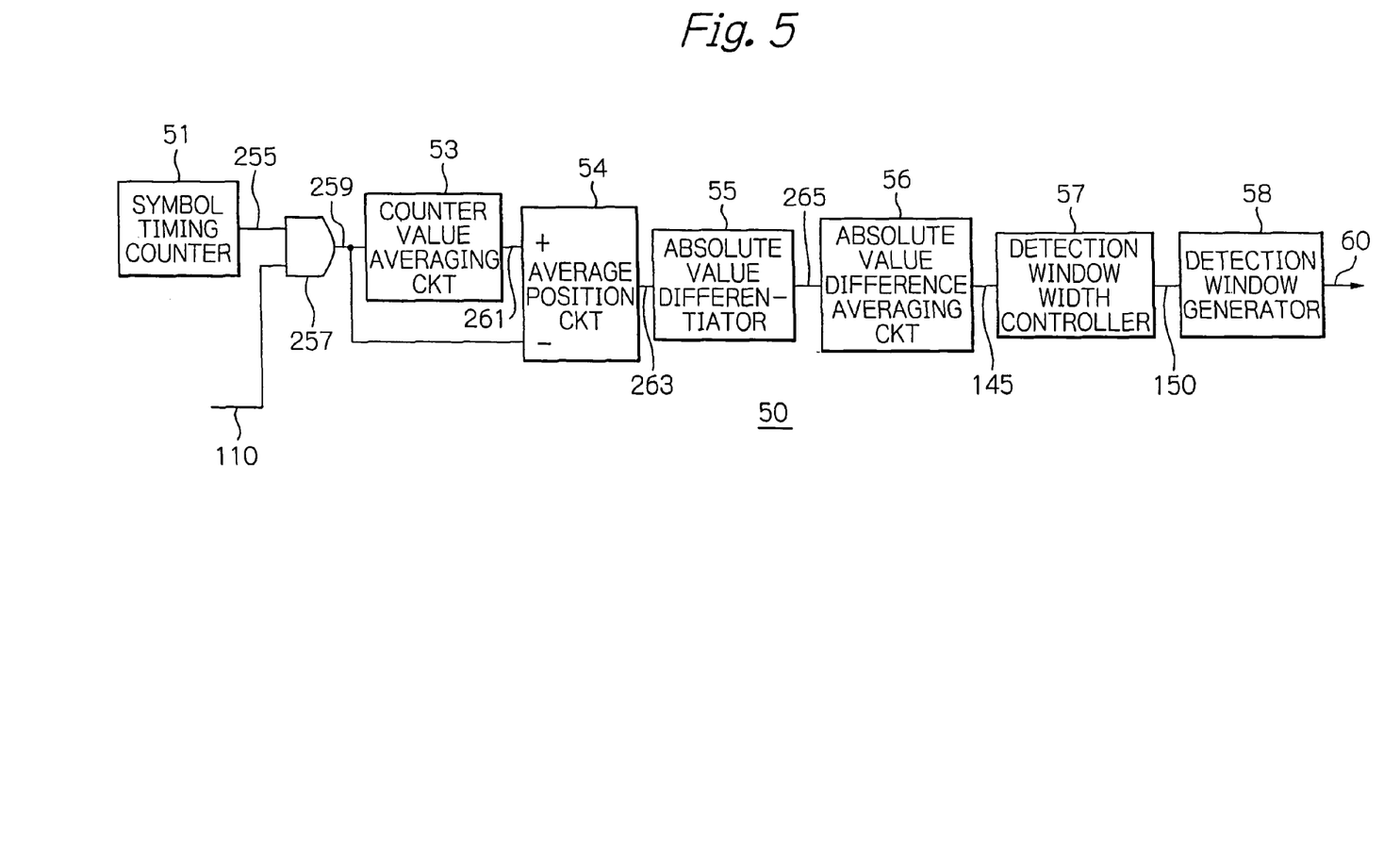
FIG. 5 is a schematic functional block diagram of the symbol detection window controller in the illustrative embodiment.
Figure 6:
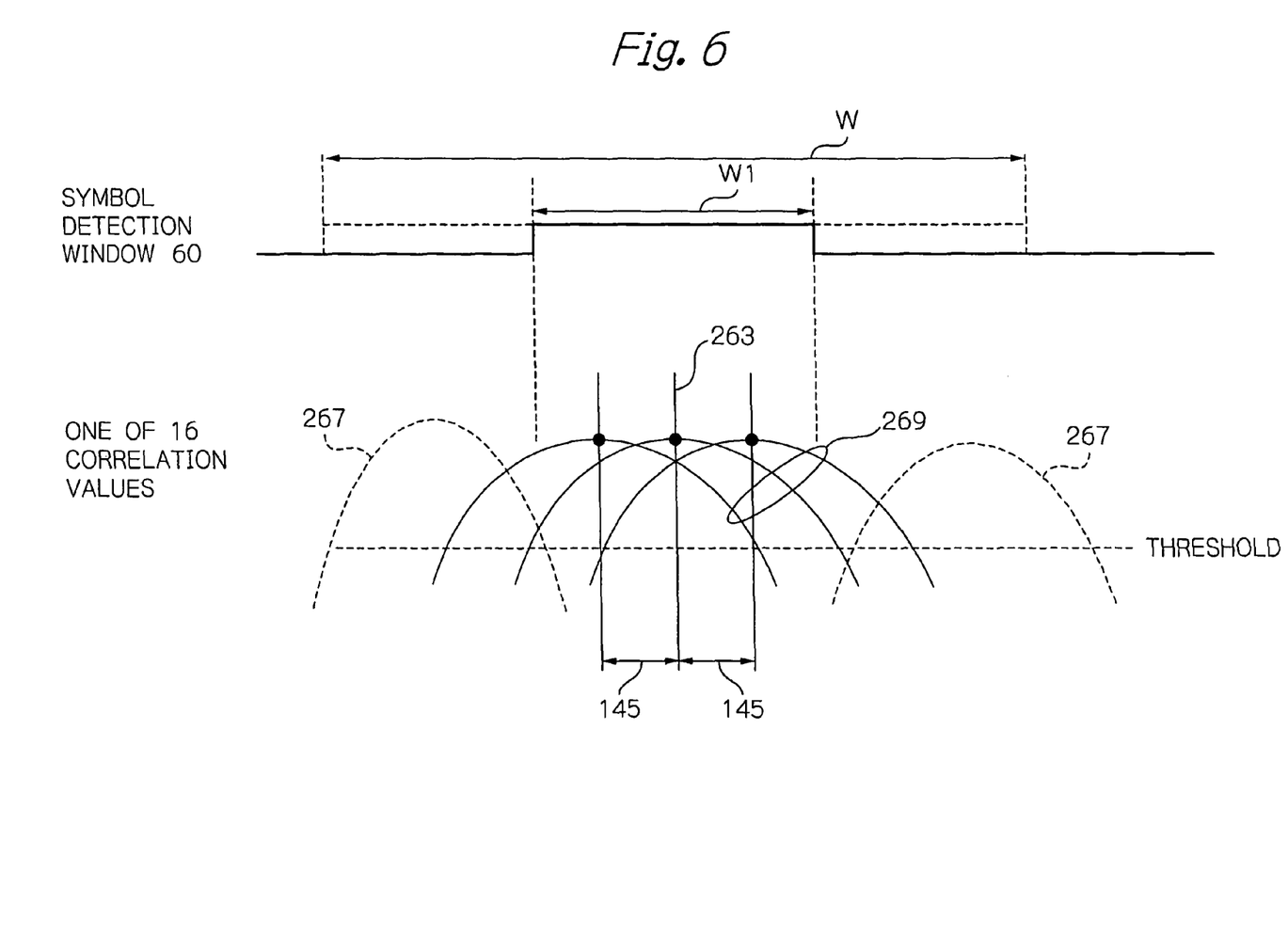
FIG. 6 illustrates how noise is excluded with the symbol detection window width controlled in the illustrative embodiment.

In order to solve that problem, the instant illustrative embodiment includes the symbol detection window controller 50 adapted for controlling the symbol detection window width in the manner described below. FIG. 5 shows in a schematic functional block diagram, the structure of the symbol detection window controller 50. FIG. 6 illustrates how noise is excluded when the symbol detection window width W is reduced.

With reference to FIG. 5 first, the symbol detection window controller 50 includes a symbol timing counter 51 that is adapted to count the symbol timing. The counter 51 has its counter output 255 connected to one of the inputs of a logical product gate 257. The logical product gate 257 has another input that receives the peak position information 110 of a correlation value determined by the correlation peak value detector 40, FIG. 1. The gate 257 also has its output 259 connected to inputs of a counter value averaging circuit 53 and an average position determining circuit 54. The counter value averaging circuit 53 is adapted for averaging counter values stored in a storage, not shown, included in the counter 51. The average position determining circuit 54 is adapted to use an average counter value 261 output from the averaging circuit 53 to obtain an average position 263 of the correlation peak positions. The average position output 263 is connected to an absolute value differentiator 55.

The absolute value differentiator 55 serves as producing a difference 265 in absolute value between the average position 263 and the counter values 259 that are subsequently input from the symbol timing counter 51. The difference 265 is connected to an absolute value difference averaging circuit 56. The absolute value difference averaging circuit 56 functions as producing an average 145 of the absolute value differences 265. The average 145 represents a variation in average position and is input to a detection window width controller 57.

The detection window width controller 57 functions as using the variation width 145 to produce detection window width information 150 as described in more detail below. The detection window width information 150 is connected to a detection window generator 58. The detection window generator 58 serves as being responsive to the detection window width information 150 to generate the symbol detection window 60.

In operation, the correlation peak value detector 40, FIG. 1, first provides the peak position information 110 of a correlation value. The symbol detection window controller 50 receives the correlation peak position information 110, and the symbol timing counter 51 stores a counter value representing the correlation peak in its storage, not shown. After receiving several symbols, the counter value averaging circuit 53 averages the counter values 255 stored in the storage.

The average position determining circuit 54 then produces from the average counter value 261 an average position 263 of the correlation peak positions. The absolute value differentiator 55 then produces the absolute values 265 of differences between the average position 263 and the counter values 259 that are subsequently input from the symbol timing counter 51. The absolute value difference averaging circuit 56 produces the average, i.e. variation width, 145 of the absolute value differences 265. Using the variation width 145, the detection window width controller 57 produces detection window width information 150. The detection window generator 58 then generates the symbol detection window 60 from the detection window width information 150.

Referring additionally to FIG. 6, the relationship between the variation width 145 and the detection window width will be described below. When the variation width 145 is equal to or less than a predetermined threshold, it is expected that the correlation peak positions of the symbols that are subsequently received will also fall in the vicinity of the average position 263. In other words, it is possible that the correlation peak positions will appear in the range of the average position 263 covering the variation width 145 on both sides, as illustrated in FIG. 6. Therefore, even when the detection window W is reduced toward the vicinity of the average position 263, for example, to the range W1 shown in the figure, the intended symbol correlation values 269 may be acquired.

The detection window width W, when not reduced, would thus have detected a plurality of correlation values 267 due to noise or the like while that symbol detection window is open, thus causing symbol errors. The detection window width W1, when reduced by the detection window width control as described above can, however, appropriately exclude correlation values 267 other than the intended symbol correlation values 269, thus acquiring the expected demodulated symbol data.

In this way, in the instant embodiment, the symbol correlation peak position 261 can be used to produce the average peak position 263, and the correlation peak position 261 and the average peak position 263 can be used to produce the variation width 145, which can be used to control the symbol detection window width W, thereby minimizing symbol detection errors.

Thus, according to the illustrative embodiment of the present invention, even when noise or the like causes a plurality of correlation values exceeding the threshold during a period when the symbol detection window is open, the intended symbol correlation values so far are used to adjust or control the width of the symbol detection window, depending on the magnitude of jitter in symbol correlation value. The correlation values other than an intended symbol correlation value may thus be excluded from an object to be detected. The problem involved in the conventional technology that a plurality of detected correlation values may cause a symbol erroneously to be demodulated can thus be avoided by the present illustrative embodiment.

Figure 7:
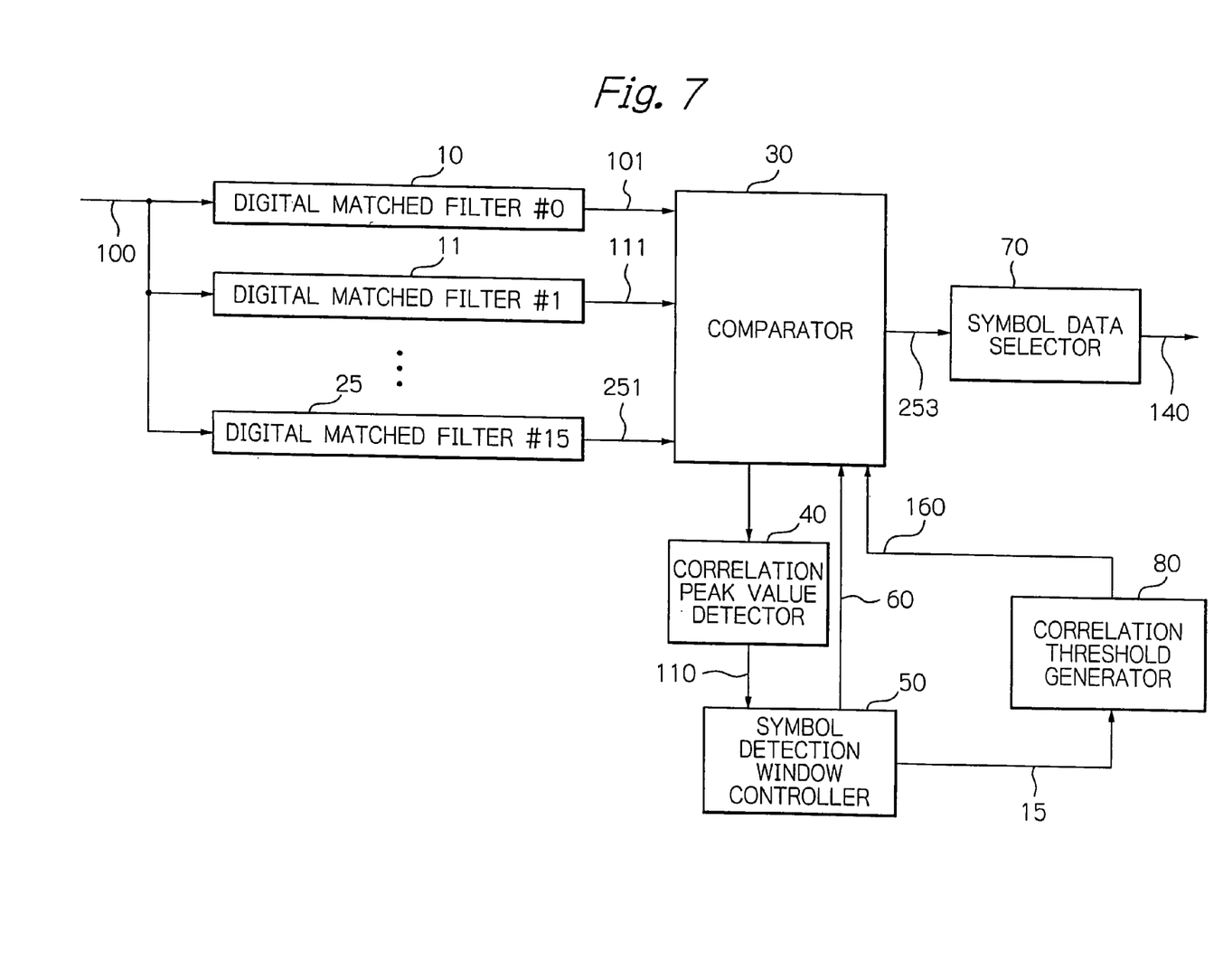
FIG. 7 is a schematic block diagram showing the configuration of a demodulator in a spread spectrum receiver of an alternative embodiment of the present invention.

Well, with reference to FIG. 7, a spread spectrum receiver in an alternative embodiment of the present invention will be described. The circuit configuration of the alternative embodiment may be the same as the illustrative embodiment described with reference to FIG. 1, except that a correlation threshold generator 80 is added in the alternative embodiment. The correlation threshold generator 80 is provided, as shown in FIG. 7, between the output 150 of the symbol detection window controller 50 and the input 160 of the comparator 30. The correlation threshold generator 80 functions as generating correlation threshold information 160 required by the comparator 30 from the symbol detection window width information 150 generated by the symbol detection window controller 50.

A description will now be given of the relationship of the symbol detection window width with the correlation threshold. In the previous illustrative embodiment, the symbol detection window controller 50 operates so that absolute value differences between a correlation peak position and the average of correlation peak positions are averaged to give a variation width, which is then used to adjust the symbol detection window width. More particularly, regardless of a high or low noise environment, jitter in correlation peak value is determined, and the jitter width and the variation width are used to adjust the symbol detection window width. Thus, in the symbol detection window, a plurality of symbol correlation values would not fall due to noise. In the symbol detection window, therefore, the correlation value of an intended symbol only is detected, so that the correlation threshold of the correlation value may be set even lower without involving a noise-induced detection error to successfully demodulate or restore intended symbols.

Considering this point, in the alternative embodiment shown in FIG. 7, the correlation threshold generator 80 is adapted to be responsive to the symbol detection window width 150 to generate the correlation threshold 160 that is supplied to the comparator 30. In generating the correlation threshold 160, when the variation width 145 and hence the symbol detection window width W is small, it is expected that a low noise environment is provided and the jitter 90 is also small. The correlation threshold may thus be set higher, still correctly demodulating the symbol. A high correlation threshold may thus be generated. Conversely, when the variation width 145 and hence the symbol detection window width W is large, it is expected that a high noise environment is provided and the jitter 90 is also large. A low correlation threshold may thus be generated. Such a correlation threshold control may even appropriately detect such a symbol that has its correlation value less than the correlation threshold and hence cannot be detected heretofore.

Figure 8:
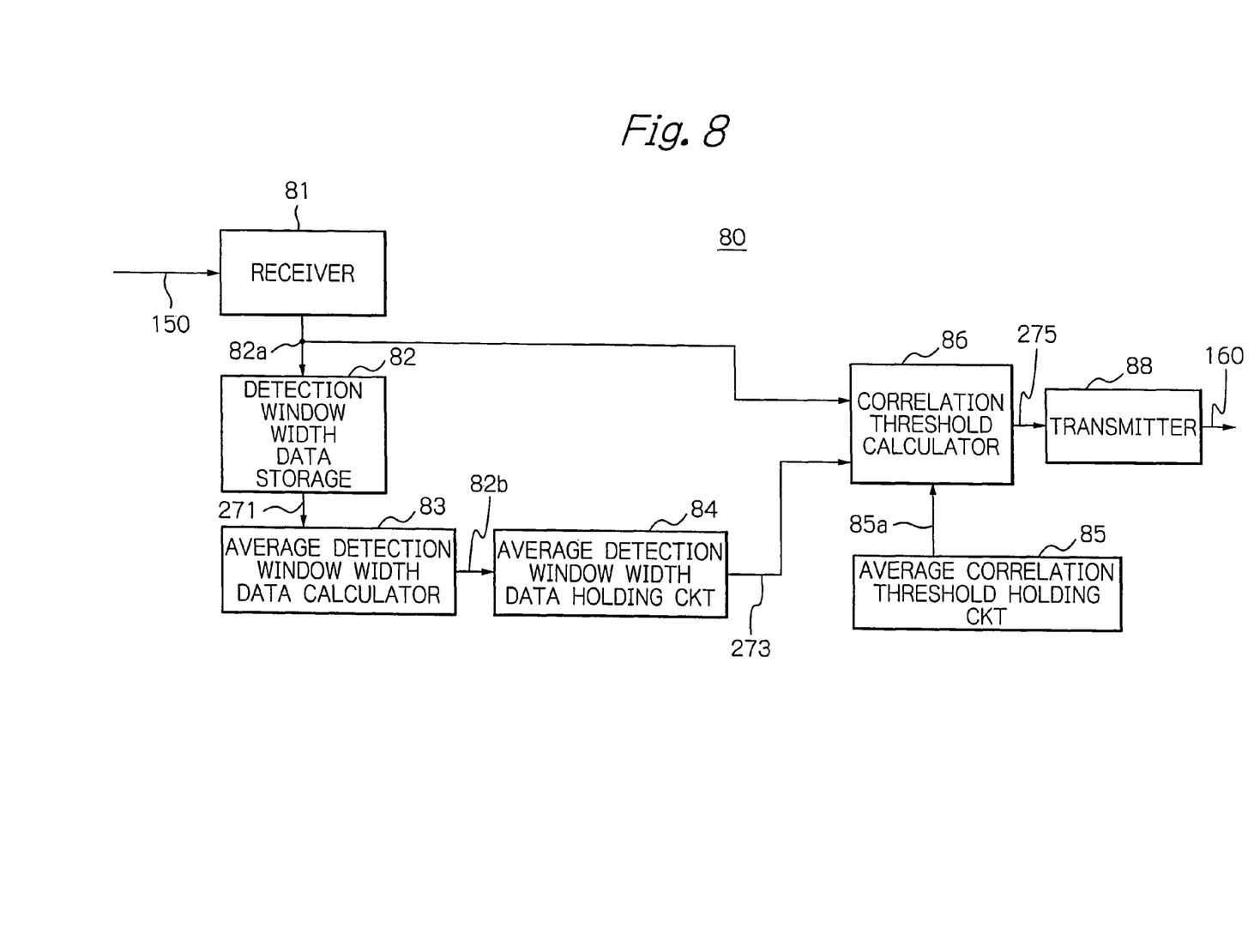
FIG. 8 is a functional block diagram schematically showing a correlation threshold generator in the alternative embodiment shown in FIG. 7.

With reference to FIG. 8 now, the correlation threshold generator 80 in the alternative embodiment includes a receiver 81. The receiver 81 is an input circuit adapted for receiving the detection window width information 150 produced at a predetermined time interval by the symbol detection window controller 50, and sending out the information 150 in the form of detection window width data 82a to a detection window width data storage 82 and a correlation threshold calculator 86. The detection window width data storage 82 serves as temporarily storing the detection window width data 82a. The storage 82 has its detection window width data output 271 interconnected to an average detection window width data calculator 83.

The average detection window width data calculator 83 functions to read out the detection window width data 82a stored in the detection window width data storage 82, and produces the average of the data 82a thus read out to develop resultant average detection window width data 82b. The average detection window width data 82b is output to an average detection window width data holding circuit 84. The average detection window data holding circuit 84 is adapted for temporarily holding the average detection window width data 82b. The holding circuit 84 has its output 273 interconnected to a correlation threshold calculator 86.

The correlation threshold generator 80 also includes an average correlation threshold holding circuit 85. The average correlation threshold holding circuit 85 is a setting circuit which has a predetermined average correlation threshold 85a set in advance to hold and send out the threshold 85a to a correlation threshold calculator 86.

The correlation threshold calculator 86 is a comparator adapted for comparing the detection window width data 82*a* from the receiver 81 with the average detection window width data 273 from the average detection window width data holding circuit 84 to calculate a difference between the detection window width data 82*a* and the average detection window width data 273. More particularly, the correlation threshold calculator 86 subtracts, when the detection window width data 82*a* is larger than the average detection window width data 273, a value corresponding to the calculated difference from the average correlation threshold 85*a* in the average correlation threshold holding circuit 85 to obtain and hold a resultant correlation threshold 275. When the detection window width data 82*a* is smaller than or equal to the average detection window width data 273, the correlation threshold calculator 86 adds a value corresponding to the calculated difference to the average correlation threshold 85*a* and holds the resulting sum as the correlation threshold 275. The correlation threshold output 275 is connected to a correlation threshold transmitter 88. The transmitter 88 serves as transmitting the output 275 as the correlation threshold 160 to the comparator 30, FIG. 7.

The operation in the alternative embodiment may be the same as the previous embodiment shown in and described with reference to FIG. 1 except the operation relating to the correlation threshold generator 80 thus added. In the correlation threshold generator 80, the detection window width information 150 produced by the symbol detection window controller 50 is input to the receiver 81 and output as the detection window width data 82*a*. The detection window width data 82*a* is stored at a predetermined time interval in the detection window width data storage 82. The average detection window width data calculator 83 averages the stored detection window width data 82*a* and produces resultant average data as average detection window width data 82*b*. The data 82*b* is in turn held in the average detection window width data holding circuit 84.

The correlation threshold calculator 86 then compares the detection window width data 82*a* with the average detection window width data 273, and calculates a difference between the detection window width data 82*a* and the average detection window width data 273. When the detection window width data 82*a* is larger than the average detection window width data 273, a value corresponding to the calculated difference is subtracted from the average correlation threshold 85*a* to obtain a resultant correlation threshold 275. The threshold 275 is then held in the calculator 86. Conversely, when the detection window width data 82*a* is smaller than or equal to the average detection window width data 273, a value corresponding the difference is added to the average correlation threshold 85*a* and the resulting sum is held as the correlation threshold 275. The correlation threshold transmitter 88 then sends out the correlation threshold 160 to the comparator 30.

The present alternative embodiment may thus provide, even in a high noise environment, an appropriately controlled width of the symbol detection window, which allow for detection of an intended symbol without being affected by noise. In addition, the detection window width can be used to control the correlation threshold at the optimum value, thus even allowing for detection of a symbol not higher than the correlation threshold, and preventing symbols from being undetected.

The entire disclosure of Japanese patent application no. 2006-164557 filed on Jun. 14, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A spread spectrum receiver comprising a plurality of correlators for obtaining correlations between a received spread spectrum signal input and all of spread code sequences for the received spread spectrum signal to produce resultant correlation values, wherein said receiver compares the correlation values produced with a correlation threshold during a period in which a symbol detection window is open and which corresponds to a symbol detection period, and, when the correlation values exceed the correlation threshold, symbol data corresponding to the spread code sequence of one of said correlators which exceeds the correlation threshold is demodulated into received symbol data, said receiver further comprising:

a correlation peak value detector for detecting a correlation peak value from the correlation values;

a symbol detection window controller operative in response to the correlation values and position information of the correlation peak value optimum window width for producing information of the symbol detection window, and generating an optimum window width symbol detection window having an optimum window width from the optimum window width information;

a comparator including a correlation threshold holding circuit for holding the correlation threshold, said comparator determining, during a predetermined period when the optimum window width symbol detection window is open, whether or not the correlation value exceeds the correlation threshold;

a symbol data selector for determining, when the correlation value exceeds the correlation threshold held in said correlation threshold holding circuit, symbol data corresponding to the spread code sequence of one of said correlators which produces the correlation value exceeding the correlation threshold as the received symbol data; and a correlation threshold generator for generating the correlation threshold from the information of the detection window width to provide said comparator with the threshold, said comparator updating the correlation threshold held in said correlation threshold holding circuit with the correlation threshold generated by said correlation threshold generator, wherein said correlation threshold generator comprises:

an average correlation threshold holding circuit for holding an average correlation threshold;

a detection window width data storage for receiving from said comparator detection window width data included in the detection window width at a predetermined time interval to store the detection window width data therein;

an average detection window width data calculator for calculating an average of the stored detection window width data, and holding the average as average detection window width data;

a correlation threshold calculator for receiving from said comparator the detection window width data included in the detection window width, said correlation threshold calculator comparing the detection window width data with the average detection window width data, calculating a difference between the detection window width data and the average detection window width data, subtracting, when the detection window width data is larger than the average detection window width data, a value corresponding to the difference from the average correlation threshold held in said average correlation threshold holding circuit to obtain the correlation threshold, and holding the obtained correlation threshold, and adding, when the detection window width data is smaller than or equal to the average detection window width data, a value corresponding to the difference to the average correlation threshold held in said average correlation threshold holding circuit to obtain the correlation threshold, and holding the obtained correlation threshold; and a transmitter for transmitting the obtained correlation threshold to said comparator.

2. A method of receiving spread spectrum wherein correlation values are obtained between an input signal and transmission spread code sequences by a plurality of correlators provided correspondingly to the transmission spread code sequences, the correlation values obtained during a period in which a symbol detection window is open are compared with a correlation threshold, the period corresponding to a symbol detection period, and when the correlation values exceed the correlation threshold, symbol data corresponding to the spread code sequence associated with a correlation value indicating a maximum of correlation peak values is used to demodulate received symbol data, said method comprising:

a first step of holding the correlation threshold;

a second step of producing a correlation value between the input signal and the transmission spread code sequences;

a third step of detecting the correlation peak value from the correlation values;

a fourth step of producing from the correlation values and position information of the correlation peak values optimum window width information of the symbol detection window;

a fifth step of generating from the optimum window width information an optimum window width symbol detection window having an optimum window width;

a sixth step of determining, during a predetermined period when the optimum window width symbol detection window is open, whether or not the correlation values exceeds the correlation threshold;

a seventh step of determining, when the correlation values exceed the correlation threshold, the symbol data corresponding to the spread code sequence of one of the correlators which outputs the correlation value exceeding the correlation threshold as the received symbol data; and an eighth step of generating the correlation threshold from the detection window width information; and a ninth step of updating the correlation threshold held in the first step with the correlation threshold generated in said eighth step, wherein said eighth step comprises:

a first substep of holding the average correlation threshold;

a second substep of storing, at a predetermined interval time, detection window width data included in the detection window width in said sixth step;

a third substep of calculating an average of the stored detection window width data and holding the average as average detection window width data; and a fourth substep of comparing the detection window width data included in the detection window width in said sixth step with the average detection window width data, said fourth substep calculating a difference between the detection window width data and the average detection window width data, subtracting, when the detection window width data is larger than the average detection window width data, a value corresponding to the difference from the average correlation threshold held in said first substep to obtain the correlation threshold, and holding the obtained correlation threshold, and adding, when the detection window width data is smaller than or equal to the average detection window width data, a value corresponding to the difference to the average correlation threshold held in said first substep to obtain the correlation threshold, and holding the obtained correlation threshold; and a fifth substep of forwarding the obtained correlation threshold to said sixth step.

* * * * *